United States Patent
Ragner et al.

(10) Patent No.: US 6,264,153 B1
(45) Date of Patent: Jul. 24, 2001

(54) BEVERAGE HOLDER FOR MOBILE EQUIPMENT

(76) Inventors: Gary Dean Ragner, 711 SW. 75th St. #103, Gainesville, FL (US) 32607; Bruce Olian, 403 W. Rosetta Ave., Foley, AL (US) 36535

( * ) Notice: Subject to any disclaimer, the term of this patent is extended or adjusted under 35 U.S.C. 154(b) by 0 days.

(21) Appl. No.: 09/228,486

(22) Filed: Jan. 11, 1999

(51) Int. Cl.⁷ .................................................. A47K 1/08
(52) U.S. Cl. .................... 248/311.2; 248/310; 224/926; 224/482
(58) Field of Search .................... 248/310, 311.2, 248/104, 316.7, 325, 322; 224/414, 926, 409, 411, 482; 220/709, 705, 737, 480, 482

(56) References Cited

U.S. PATENT DOCUMENTS

| | | | |
|---|---|---|---|
| D. 255,635 | 7/1980 | Valmassei | D7/70 |
| D. 325,495 * | 4/1992 | Rowles | D7/620 |
| D. 367,998 | 3/1996 | Graw et al. | D7/620 |
| 2,633,278 | 3/1953 | Muniz | 224/42.46 |
| 3,269,683 | 8/1966 | Shinaver | 248/230 |
| 4,071,175 | 1/1978 | Wagnon | 224/36 |
| 4,131,259 | 12/1978 | Frank | 248/311.1 |
| 4,324,381 | 4/1982 | Morris | 248/311.2 |
| 4,535,923 * | 8/1985 | Manke | 224/273 |
| 4,765,581 * | 8/1988 | Wallace et al. | 248/311.2 |
| 4,779,831 * | 10/1988 | Anderson | 248/311.2 |
| 4,799,638 * | 1/1989 | Allen | 248/311.2 |
| 4,877,164 * | 10/1989 | Baucom | 224/42.44 |
| 4,896,858 * | 1/1990 | Sokolski et al. | 248/311.2 |
| 4,993,675 * | 2/1991 | Walker | 248/311.2 |
| 5,029,793 * | 7/1991 | Warner | 248/318 |
| 5,082,220 * | 1/1992 | Pollock et al. | 248/104 |
| 5,143,335 | 9/1992 | Frankel | 248/215 |
| 5,145,138 * | 9/1992 | Schlanger et al. | 248/311.2 |
| 5,190,257 | 3/1993 | Gradei et al. | 248/231.7 |
| 5,249,702 * | 10/1993 | Topp et al. | 220/705 |
| 5,251,777 * | 10/1993 | McMahon | 220/480 |
| 5,361,950 * | 11/1994 | Signal et al. | 224/151 |
| 5,425,484 * | 6/1995 | Kawand et al. | 224/32 |
| 5,464,183 | 11/1995 | McConnell et al. | 248/311.2 |
| 5,490,622 * | 2/1996 | Tardif | 224/556 |
| 5,494,306 | 2/1996 | Adamson et al. | 280/33.992 |
| 5,511,754 * | 4/1996 | Johannsen | 248/311.2 |
| 5,573,214 * | 11/1996 | Jones et al. | 248/311.2 |
| 5,582,320 * | 12/1996 | Lin | 220/708 |
| 5,720,458 * | 2/1998 | Carpenter | 248/205.1 |
| 5,833,194 * | 11/1998 | Jones et al. | 248/311.2 |

* cited by examiner

*Primary Examiner*—Anita M. King
*Assistant Examiner*—Kimberly Wood

(57) ABSTRACT

An improved spill resistant beverage container holder for use on equipment such as bicycles and lawn mowers to provide easy access to the beverage. Being of the type having a body (99) for holding a beverage container, and a support arm (90) with an integral spring (96) and attachment clip (92). Clip (92) provides pivotal and removable attachment to a generally cylindrical bar and the entire holder is shaped so that it can be injection molded as a single piece in a single-action mold.

17 Claims, 7 Drawing Sheets

Figure 1:
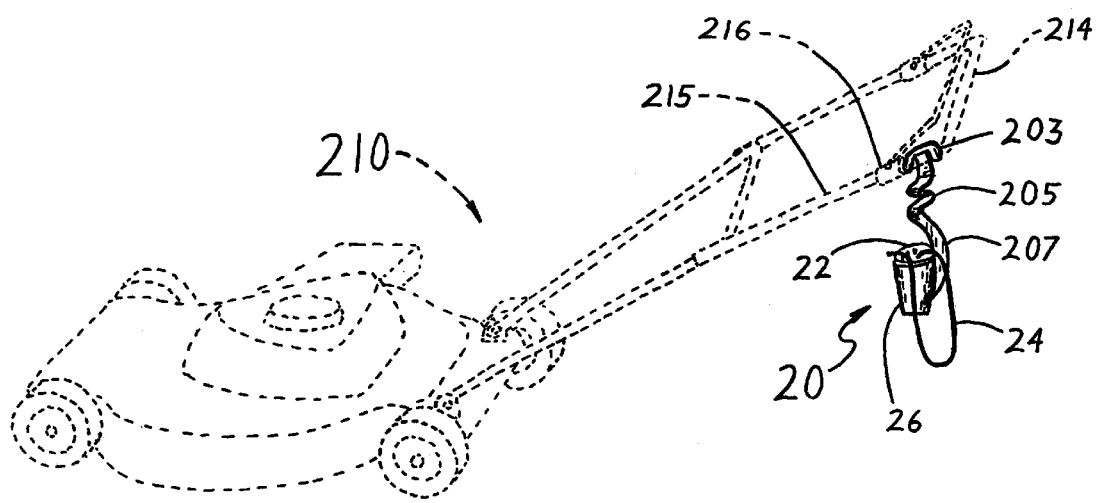

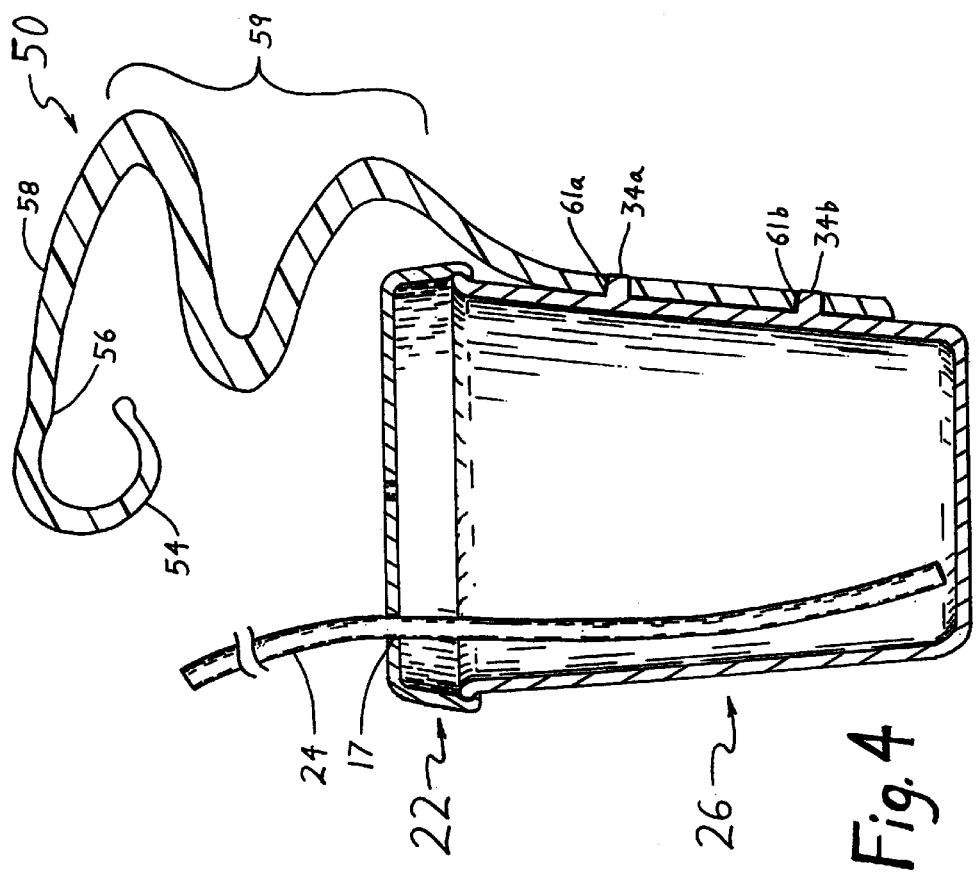
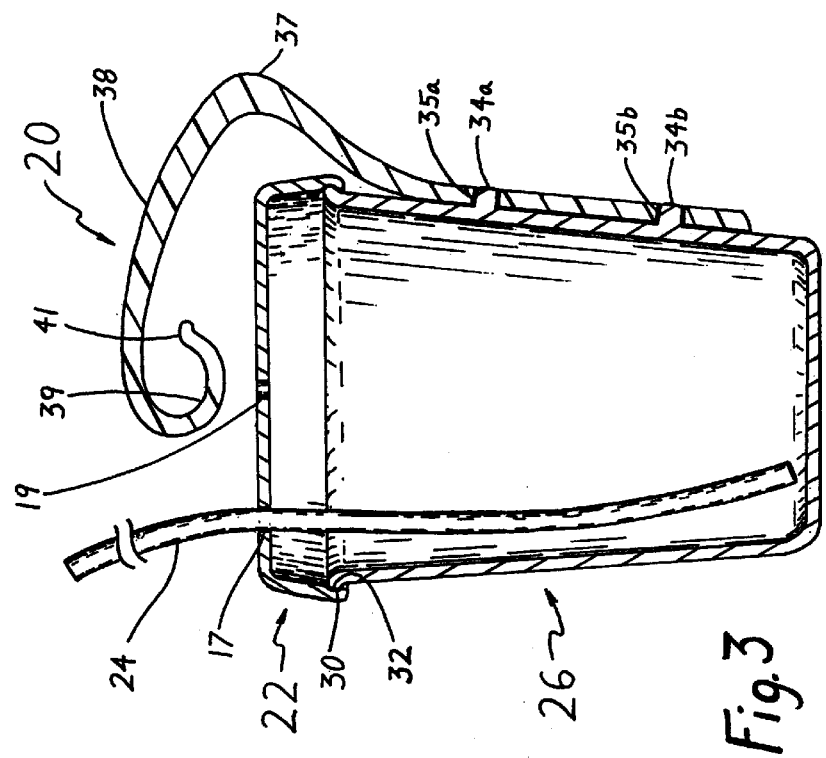

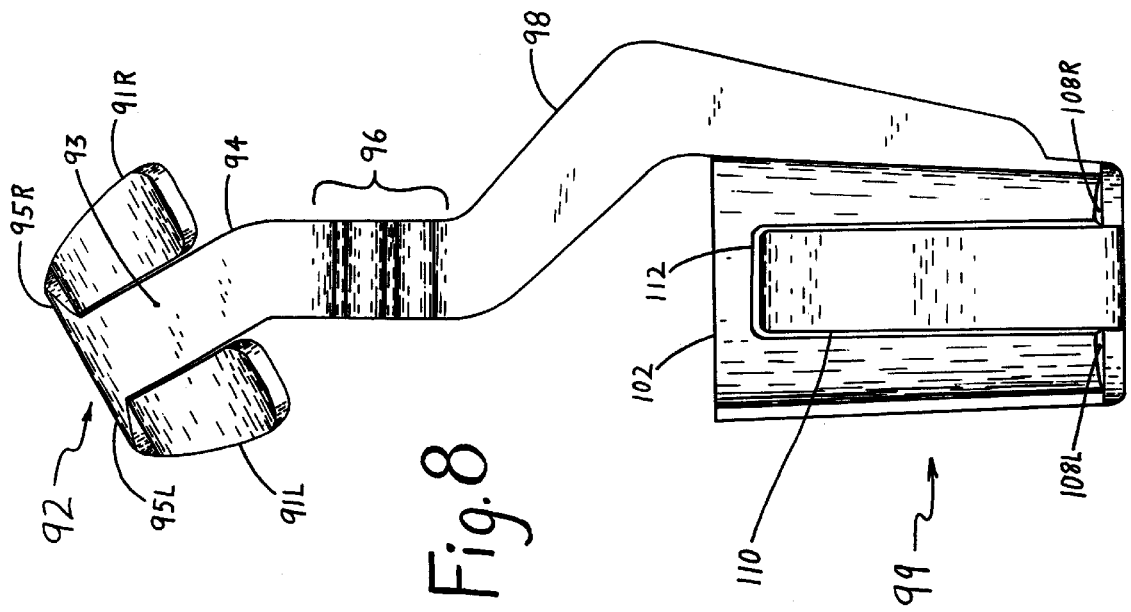
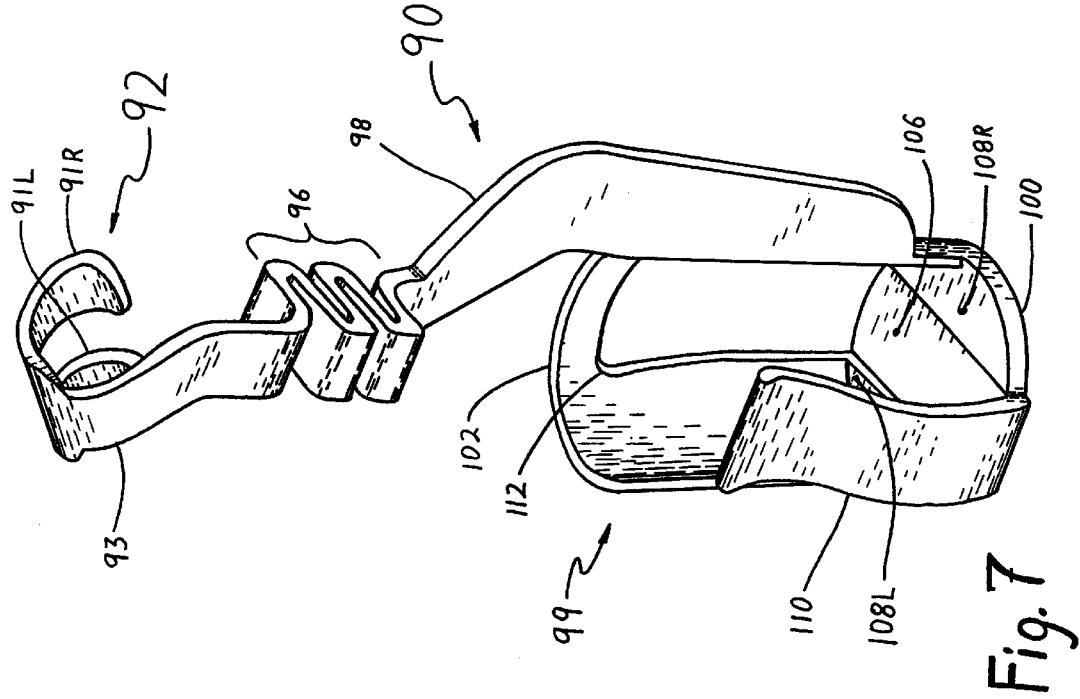

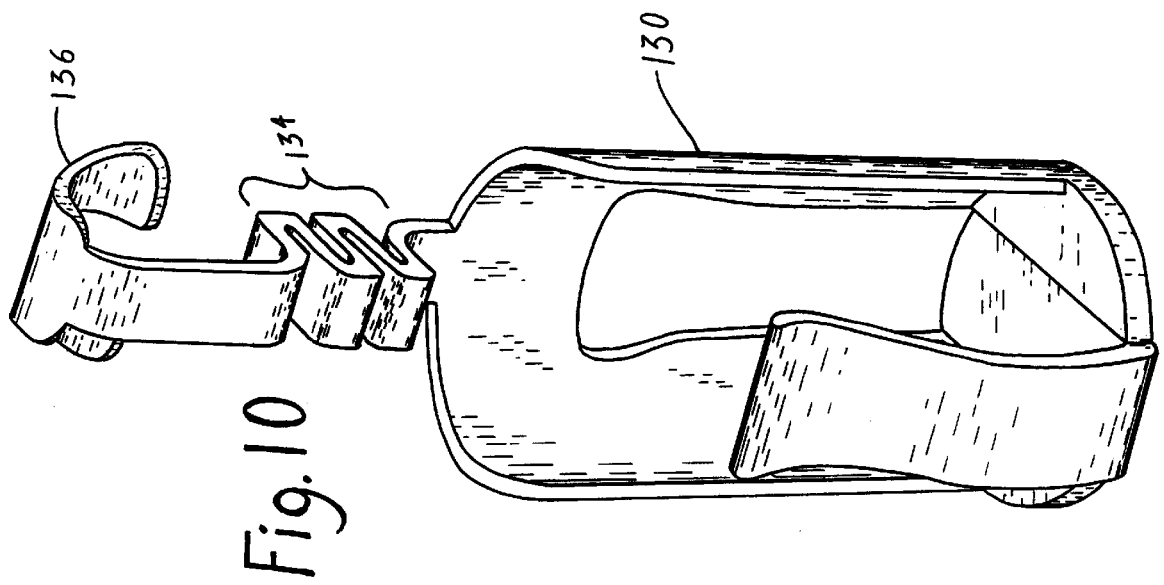
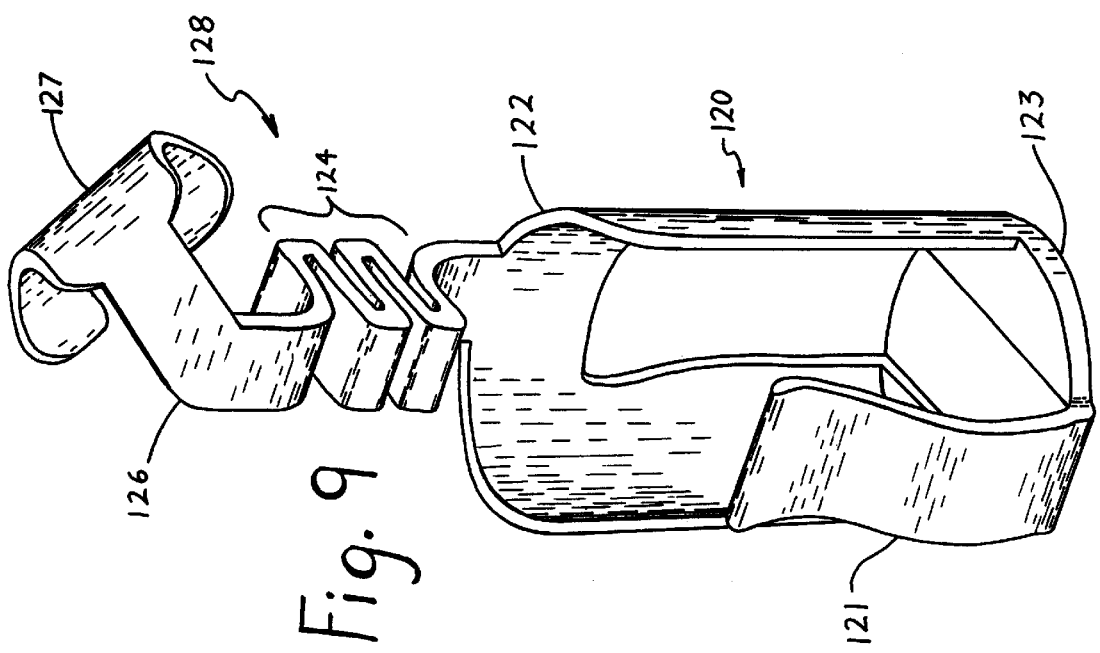

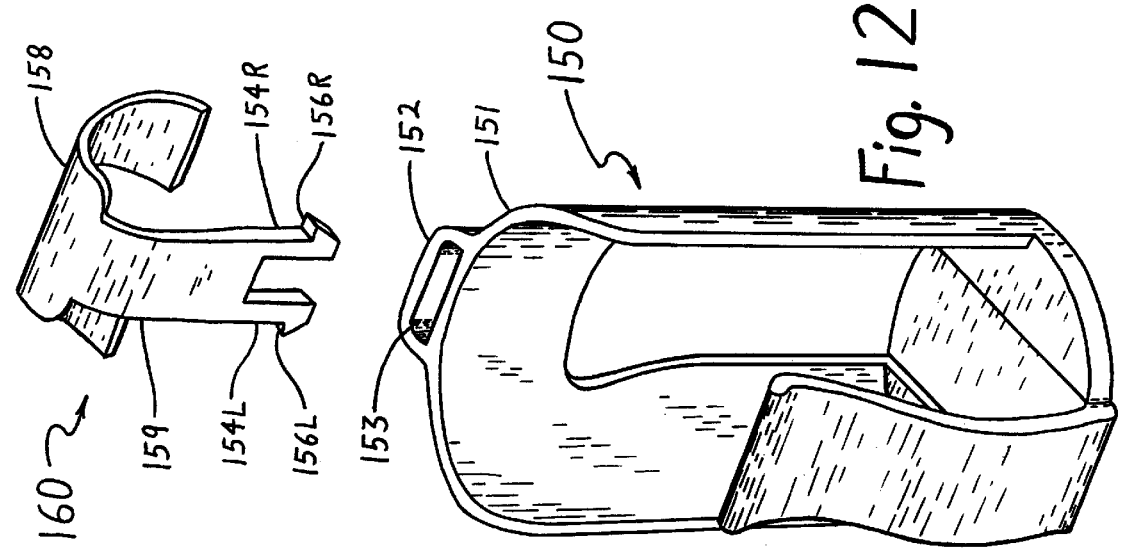
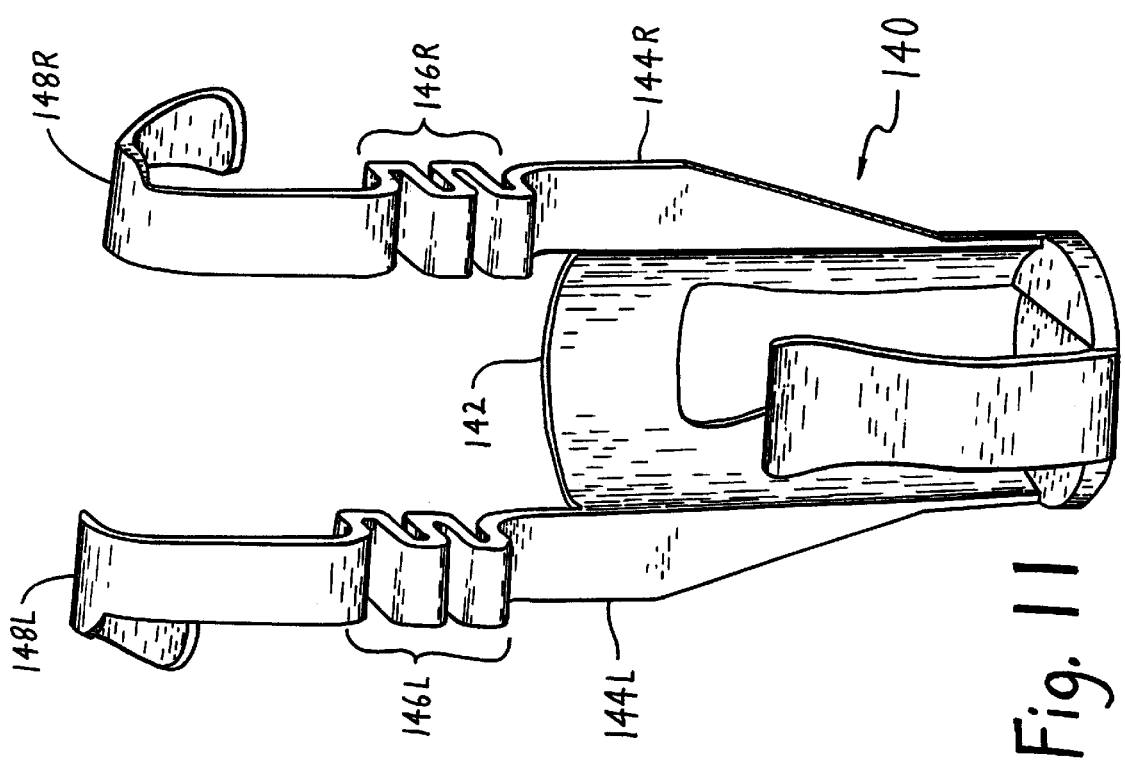

BEVERAGE HOLDER FOR MOBILE EQUIPMENT

BACKGROUND

This invention relates to beverage holding devices and more specifically to beverage holding devices that can be temporarily attach to a bar like those found on a lawn mowers, bikes, baby strollers, wheelchairs, walkers and the like.

DESCRIPTION OF PRIOR ART

A number of mobile cup and beverage container holders have been invented. Most have been designed for automobiles which have a relatively smooth ride compared with the jolting (violently vibrating) motions experienced on a bike or lawn mower. A number of patents have been issued that are designed for use with moving equipment, but very little has been done to address the wide degree of movement that the cup holder must dampen.

U.S. Pat. No. 5,494,306 to Adamson for a "Shopping Cart with Adjustable Holder for Cups", U.S. Pat. No. 4,071,175 to Wagnon for an "Anti-Rattle Bicycle Beverage Container Holder", U.S. Pat. No. 3,269,683 to Shinaver for a "Carrier Attachment for Open-Top Containers, and U.S. Pat. No. 2,633,278 to Muniz for a "Bottle Holder for Grocery Carts" all show mobile beverage container holders, but none of them show a means to provide spring-action or shock absorbing features. Further, none allow for the multiple angles of acceleration and pivoting of the cup holder while mobile. In reality these designs would have great difficulty keeping a liquid in an open container from spilling. The disclosed invention solves this problem by using a resilient member that dampens shock (dampness vibration from all directions and also allows pivoting of the cup holder along two axis to keep it relatively level with respect to the net acceleration experienced by the holder.

U.S. Pat. No. 5,143,335 to Frankel for a "Handle Support Assembly" shows a cup holder for a mower, but his design is rigidly mounted to the mower with an attachment assembly to which a cup holder may be attached. The disclosed invention does not use a separate attachment assembly, thus allowing easy removal. Instead, it integrates this function into the holder itself. Frankel's design also lacks any means of spring-action for either vertical forces or side forces. In general, no open container could be put in such a holder without spilling. Also because of the two part construction it can never be molded as a single plastic part. And finally, Frankel's design does not show any resilient means for holding the canned and bottled beverage securely in place and does not show a means to allow multiple sized beverage containers.

U.S. Pat. No. 5,464,183 to McConnell for a "Stroller Accessory Bar and Drink Holder" shows a mobile drink container holder which attaches to side bars of a push bar with a rigidly mounted attachment bar. A cup holder is shown which has a single axis pin pivot which requires a clamping strap to hold the cup in place. The pivot has no spring-action or way to limit rotation, the drink is allowed to swing until the holder of drink hit the attachment assembly. It does not show any vertical spring-action nor restrained resilient two axis pivoting as the disclosed invention to reduce sloshing of liquids. Finally, McConnell's design is not possible to construct from a single injection molded piece of plastic, as is the disclosed invention.

U.S. Pat. No. 5,190,257 to Gradei for a "Beverage Container Holder", U.S. Pat. No. 4,324,381 to Morris for a "Beverage Container Support", and U.S. Design Patent No. D255,635 to Valmassei for a "Beverage Container Holder" all show container holder with a single pivot axis, but only Valmassei's describe an integrated pivot. None disclose a means for two axis pivoting, show a means for absorbing vertical shock, or show a resilient means for holding multiple sized drink containers securely in place.

U.S. Pat. No. 4,131,259 to Franks for a "Swinging cup holder", and U.S. Design Patent No. D367,998 for a Self-Leveling Beverage holder" both show a two axis pivotal holder design, but show no integrated vertical restrained. Neither can be molded from a single piece of plastic and neither show an active means for secure a drink container in the holder. Further Franks' design has many parts and designed to mount to a solid wall not a bouncing piece of equipment.

The disclosed invention also allows for the integration of the beverage container with the beverage container holder. A number of patents show sealed beverage containers for moving equipment, but none where found that showed a pivotal mounting means nor any means for resilient vertical shock absorption.

OBJECTIVES AND ADVANTAGES

Accordingly, several objects and advantages of our invention are:

a) Holder attachment allows easy mounting and removal of beverage holder from lawn mowers and bikes.

b) Convenient placement of beverages while mowing and bike riding.

c) Design allows simple single-action injection molds.

d) Integral spring provides shock absorption for beverage holder (allowing the holding of canned and bottled beverages with minimal spilling).

e) Beverage holder will except a wide assortment of beverage bottles and cans.

f) Beverage holder attachment and integral spring formed from a single piece of plastic.

g) Integral spring allows limited two axis of rotation and limited three axis of linear motion.

h) A beverage holder with shock absorption sufficient to allow carbonated beverages to be carried on high-vibration mobile equipment without significant foaming.

DRAWING FIGURES

FIG. 1 Shows one embodiment attached to a lawn mower.

Figure 2:
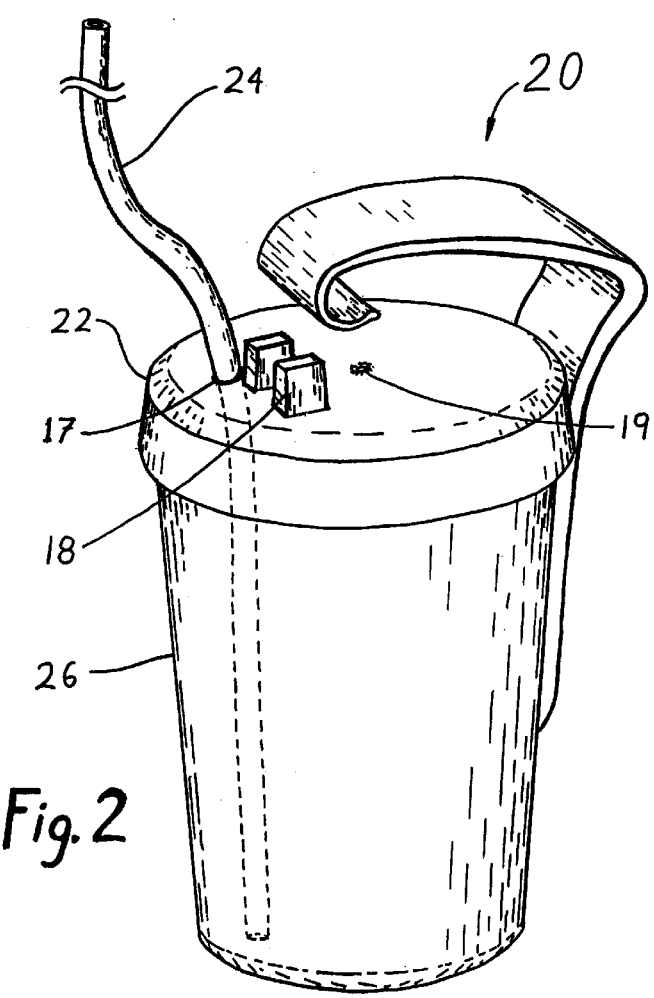

FIG. 2 Preferred embodiment in perspective view.

FIG. 3 Preferred embodiment section view.

FIG. 4 Preferred embodiment in section with alternative support arm

Figure 5:
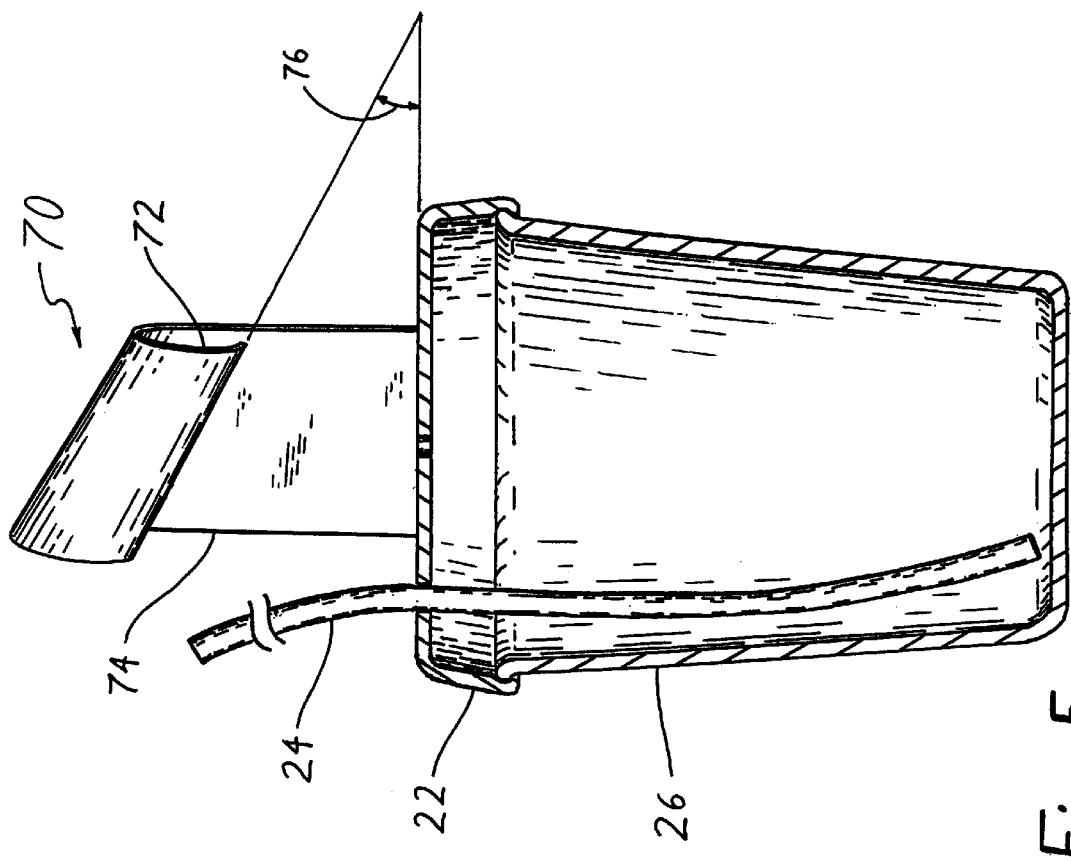

FIG. 5 Preferred embodiment in section with alternative support arm with angled attachment clip.

Figure 6:
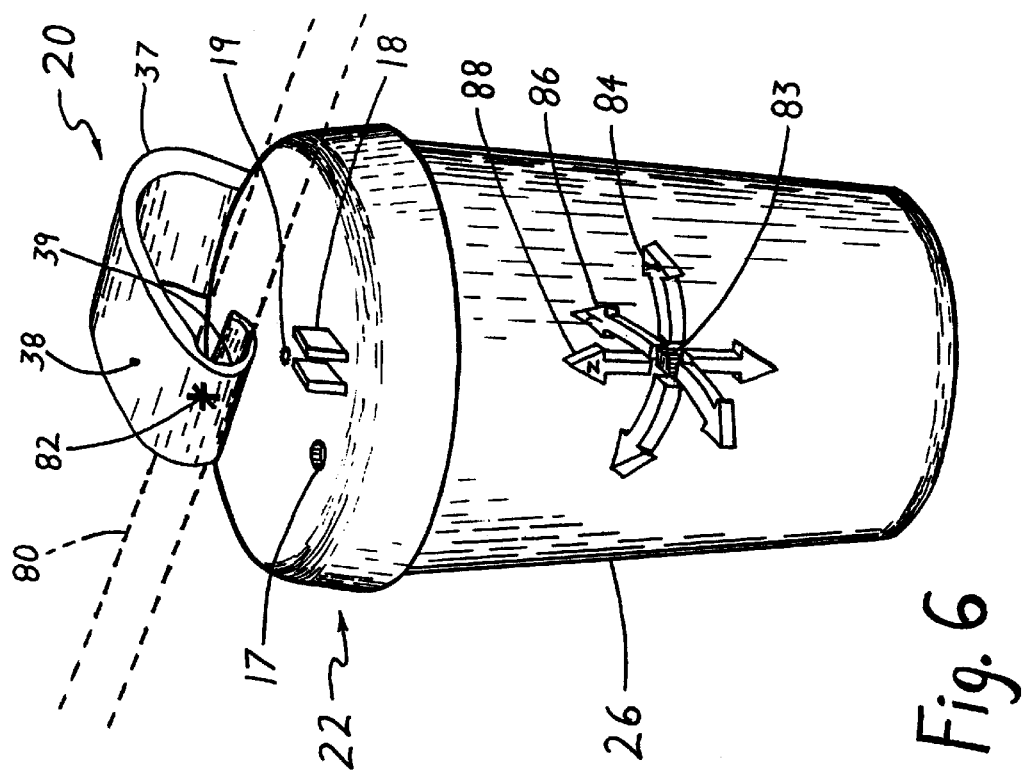

FIG. 6 Preferred embodiment in perspective with freedom of motion diagramed.

FIG. 7 Alternative embodiment in perspective

FIG. 8 Alternative embodiment in front view.

FIG. 9 Alternative embodiment with support arm attached at rear of body

FIG. 10 Alternative embodiment with support arm attached rear of body with horizontal attachment clip.

FIG. 11 Alternative embodiment with two support arms

FIG. 12 Alternative embodiment with detachable support arm

Figure 13:
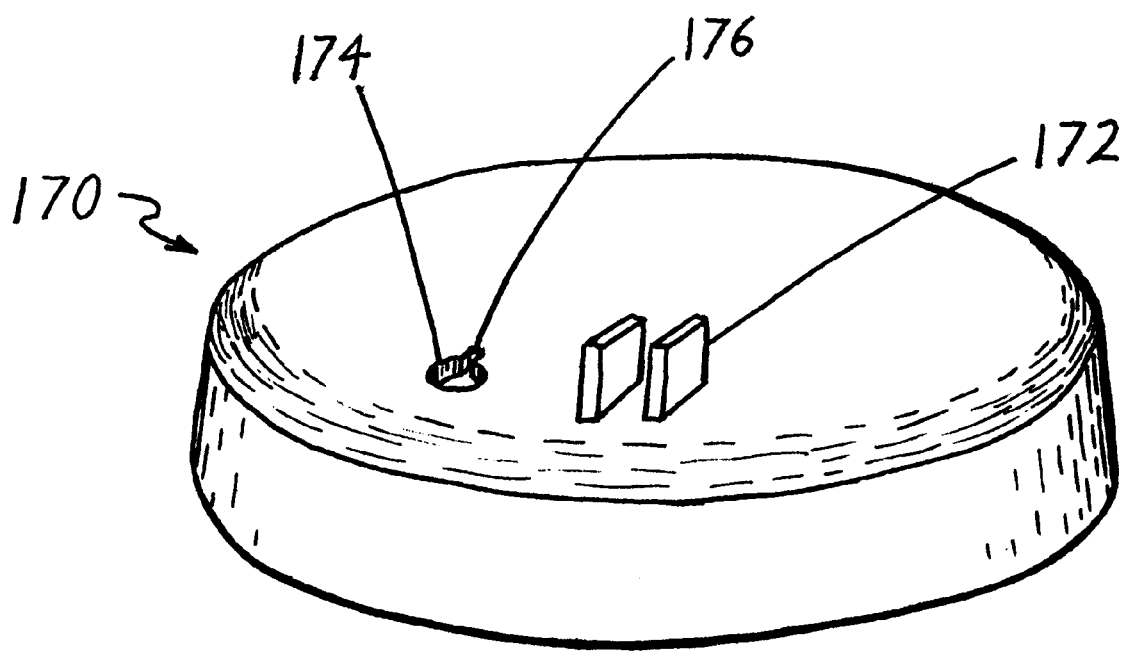

FIG. 13 Alternative lid with notched straw hole

The beverage holders disclosed here provides a solution for carrying beverages on mobile equipment such as a bicycle or lawn mower where unpredictable accelerations occur from many different directions. They mount easily with a snap on clip and can be removed just as easily. The designs also allow easy manufacturing by injection molding because of their special shape. And by including a resilient spring-like section to the support arm, opened cans and bottles can be used with a minimum of spillage by allowing the holder to move and pivot with forces to keep the container relatively level.

DETAILED DESCRIPTION OF THE PREFERRED EMBODIMENTS

FIG. 1 shows a beverage holder 200 attached to a side push-bar 215 on a lawn mower 210 (drawn in shadow). The holder consists of a pivotal mounting means 203 (also called "attachment clip"), a resilient section 205, a support arm 207, a flexible straw 24, a body 26, and a lid 22. Pivotal mount 203 is made of a resilient plastic as is the rest of the holder, and snaps into place around the mower's sloping side bars 215. Modern lawn mowers have many safety features that clutter horizontal push-bar 214 with control bars than must contact with it. This limits what can be snapped onto this horizontal section of the mower handle. The side push-bars are less restrictive, and because of safety features, there is usually a number of brackets that can be used as a stop to keep the holder from sliding down the bar. In FIG. 1, the holder is shown restrained from sliding down the push-bar by a control bracket 216.

FIG. 2 shows one of the preferred embodiment of the disclosed beverage holder. The holder shown in FIG. 2 comprises four basic parts: cup shaped body 26, lid 22, a support arm 20 and flexible straw 24. The lid is an injection molded part with a straw hole 17 which allows the straw to pass through the lid and is sized so that the straw fits snugly to prevent unintentional pull-out. The lid also has a pair of vertical pegs 18 which act as a straw holder when the straw is not in use. The straw is forced between the pegs and compression of the straw holds it in place. The lid also has a small center hole 19 molded into it. This center hole allows air pressure to equalize as liquid is removed through the straw. Support arm 20 is attached to the side of body 26 and arcs above the body to provide support for the entire holder and is made of a resilient plastic.

FIG. 3 shows a section view of the same beverage holder that is FIG. 2. The lid has been rotated slightly so that the cut passes through the center line of the holder, and through the middle of support arm 20, straw hole 17, and air vent hole 19. The straw holder posts 18 are on the half of the lid that has been cut away and does not show in this figure. Lid 22 snap fits onto body 26 by the interaction of a groove 30 on the inside rim of the lid with a ridge 32 around the top rim of the body. Tolerances for the groove and ridge is such that the lid and body can be snap together and form a tight seal. The support arm is attached to the body by holes 35a and 35b fitting over pegs 34a and 34b on the body and the two pieces melted, glued, or bonded together in another way. Support arm 20 has a curved section 37 built into it which provide both spacing for the lid and resiliency for spring-action in the support arm. A horizontal section 38 of the support arm also provides spring-action and arcs above the lid to place an attachment clip 39 (also called "pivotal mounting means"), above the center of gravity of the system. This allows the holder to hang in a generally vertical manner. The attachment clip is designed to slip easily over a cylindrical shaped bar with the resiliency in the plastic providing a gripping force to hold it securely onto such a bar. A slightly curled section 41 is placed on the end of the attachment clip to allow easier clipping onto a bar.

FIG. 4 shows the same body, lid and straw as in FIG. 3, but with a different support arm 50 is section. Support arm 50 attaches to the body as before with pegs 34a and 34b interlocking with holes 61a and 61b respectively. Melting of the plastic or glueing the joint holds the two parts together. On this support arm, three curved sections 59 are shown to provide greater spring-action than the one curved section of support arm 20. This provides a softer ride and easier rocking of the body from side to side as forces change. An attachment clip 54 is placed on the end of the support arm and is similar to that found on arm 20, except for a slight angle change 56 which helps hold onto a cylindrical bar more securely by letting gravity push the clip onto the bar. The angle change at 56 can be varied depending on preference and can be anywhere from zero degrees to 180 degree. The greater resiliency of support arm 50 will also allow the body to sag forward more. To provide level operation, horizontal arm section 58 can be lengthened to place the attachment clip portion of the support arm approximately above straw hole 17, thus placing the center of gravity behind the attachment clip. In this way, as support arm 50 stretches, the body can ride approximately level when full of liquid.

In FIG. 5 we see the same body 26, lid 22 and straw 24 with another support arm 70 which is similar to support arm 20 in FIG. 2 and 3. An attachment clip 72 is angled to provide level mounting on a diagonally running cylindrical bar. A horizontal section 74 is also slightly modified compared to horizontal section 38 in FIG. 3, in that it has a slight twist to it to provide the angle for clip 72. Angled attachment clip 72 snaps onto the side bar of a mower for easy access for the user. The lower edge of clip 72 engaging a stop or bracket on the mower handle side bar to keep it from sliding down the side bar. Angle 76 will depend on the mower (or other equipment) on which it will be placed so that it hangs approximately vertically. In practice, this angle can be anywhere between zero and ninety degrees. At ninety degrees a second horizontal section would be needed to place the clip to the side of the holder so that the body would rest against the vertical bar, and thus hang vertically. Most lawn mowers have a side bar angle of about 40 to 50 degrees.

FIG. 7 shows another preferred embodiment which is designed to hold beverage containers such as canned, bottled, and cupped beverages. It is made from a single injection molded piece of plastic that is resilient. The holder consists of two basic sections, one is a holder body 99 comprised of base 100, back wall 102, and front retaining clip 110; and a support arm 90 comprised of lower arm portion 98 of the support bar, resilient spring-like section 96, angled section 94 and attachment clip 92. All sections of the holder are designed to allow simple single-action injection mold plates to produce the part. This saves money on mold costs. If we define retaining clip 110 to be at the front of the holder then two mold plates, one coming from the front and one from the back, can define all surfaces. Molding hole 112 is provided to allow the back mold plate access to the back side of retaining clip 110. Surface 106 would be molded by the back mold plate and is angled so as to allow easy de-molding. Similarly, surfaces 108R and 108L are formed by the front mold plate and angled with the opposite slope for easy de-molding. Resilient section 96 (or spring section) has a repeating "S" shaped pattern to it or corrugated pattern, which allows stretching to absorb shock. Above this spring the support arm angles at 94. This allows mounting of the holder on diagonal bars such as the side bar of a lawn mower push bar. Attachment clip 92 is also designed to be molded from the front and back, with the insides of tongues 91R and 91L being formed by the front mold plate and the inside of support arm section 93 being molded by the back mold plate. FIG. 8 shows a front view of attachment clip 92 and how all front surfaces can be reached from this orientation. Upper attachment sections 95R and 95L are horizontal sections of the clip that connect the upper support arm to the clip tongues and are solid section so they can easily be molded in the same mold plane.

In FIG. 8 we see a front view of the holder in FIG. 7. Notice that fingers 91R and 91L are to the side of upper support arm 93. This allows both sides of the fingers and both front and back of the support arm to be molded by a simple two plate mold. One mold plate would form all the surfaces facing backward on the holder and another mold plate would form all the surfaces visible in this front view of the holder. Sides that run front to back (into the page) would be molded by either plate depending on which mold plate would be most convenient to form that surface. The body of the holder shown in FIG. 8 is shaped so that all sides can be molded from the same molding direction as the rest of the holder. Retaining clip 110 is made slightly smaller than molding hole 112. In this the back mold plate can extend through the hole and provide a surface for molding the back side of clip 110. Surfaces 108R and 108L are sloped upward from front to back so that the front mold plate can be easily withdrawn from the part during de-molding. Likewise surface 106 (not visible in FIG. 8 - see FIG. 7) is angled downward from front to back so that the rear molding plate can easily be withdrawn from this surface. Thus, this design allows a simple single-action injection mold to form a three dimensional structure for attachment to a cylindrical bar which can grip and hold beverage cans and the like.

In FIG. 9 we see an alternative design where a support arm 128 is attached to the middle of a back wall portion 122. The support arm has a curved section 126, an attachment clip 127, and a resilient spring-like section 124 similar to that shown in FIGS. 7 and 8. Body 120 of this design is also similar to that of holders shown in FIGS. 7 and 8, having a similar base 123 and retaining clip 121.

FIG. 10 shows another optional support arm. This arm lacks the angled section on the upper support arm (angle=0) so that the holder will hang vertically on a horizontal bar. Attachment clip 136, resilient section 134, and body 130 are all similar in construction and operation to those seen in FIGS. 7 through 9.

FIG. 11 shows another option for the support arm, that is, to have two arms instead of one. In this design a right and left support arm comprising lower support arm 144R and 144L, resilient section 146R and 146L, and attachment clip 148R and 148L respectfully are attached to the sides of back wall 142 of body 140. The body portion of this design is essentially identical to that of FIGS. 7 through 10. Attachment clips 148R and 148L are similar to the attachment clips shown in FIGS. 10 except the inside finger has been removed on both clips. There is no reason this holder cannot have a two finger attachment clip as shown in FIGS. 10, it is simply a alternative design. Also, one of these support arms can be made shorter than the other to allow attachment to angled bars.

FIG. 12 shows another option for the support arm. A support arm 160, which is a separate molded plastic piece that can be attached to body 150 at connecting port 152. The support arm could be permanently attached by melting, glueing or other means similar to that shown in FIGS. 3 and 4, however, in this design the support arm is removable and reversible. Body 150 is similar to those in FIGS. 7 through 11 except for a connecting port 152 which is added on the back side of wall 151. This port is shaped like an oblong tube open at both ends, with hole 153 passing though it This port excepts the bottom portion of support arm 160. The resiliency of the plastic allow arms 154R and 154L to press inward at the ends when entering hole 153. After being inserted far enough the arms expand outward as hooks 156R and 156L snap pass the end of hole 153, thereby locking it in place. Notice that a spring section (or resilient section) can easily be added onto the attachment arm body 159 as in the designs shown in FIGS. 7 through 11. Also notice that the attachment arm can be rotated 180 degrees along the vertical so that attachment clip 158 faces the opposite direction and placing the attachment clip over the body of the holder for better balance of the system when hanging.

FIG. 13 shows an alternative lid 170 for placement on a cup body like body 26 in FIGS. 1 through 6. This lid has a pair of straw holder pegs 172 for securing the drinking end of a straw. The lid also defines a straw hole 174 to allow a straw to be snugly inserted. An air inlet notch 176 is placed on the edge of hole 174 to provide a means for air entry which equalizes air pressure within the holder body as beverage is removed. Notch 176 can be thought of as the air inlet hole 19 in FIGS. 2 through 6, moved to the edge of straw hole 17.

OPERATIONAL DESCRIPTION - FIGS. 6 and 7

In FIG. 6 we see the preferred embodiment attached to a horizontal bar 80 which is part of a mobile piece of equipment (e.g., lawn mower push-bar). Attachment clip 39 grips the bar by snapping over the bar and uses the resilient force in the clip to hold itself in place, but does not prevent rotation of the clip around the bar if sufficient force is applied. A beverage is placed in body 26 and sealed in by snapping lid 22 in place. A straw (not shown) is placed in hole 17 so that the user can suck the beverage out of the body. Hole 19 allows air to enter the body to replace beverage removed. When the straw is not in use, the drinking end of the straw (the end the user sucks on to drink) may be forced between straw holder posts 18 for later use, this also prevents any siphoning of beverage out of the holder. When the holder is attached to a device such as a lawn mower it will experience changing forces causing it to move in many directions. The design is such that many degrees of freedom are allowed by the support arm 20. Point 82 is a fixed reference point with respect to bar 80, with body 26 translating and rotating with respect to this point and its approximate center of mass 83 when full. When forces are exerted to the side of the holder (x-direction) the holder body will move in the direction denoted by arrows 84. This motion is limited by torsional flexing within horizontal section 38 of the support arm and to a lesser extent by twisting in the curved section 37. The holder will also rotate in the forward and backward direction (y-direction) by the rotation of attachment clip 39 on bar 80. This rotation is not free, but is dampened by the friction resulting from the resilient gripping of the clip. When vertical forces are experienced the holder body can move up and down (z-direction) by spring-action in curved section 37 and horizontal arm 38 of the support arm. Thus, by allowing these two axis of rotation and one axis of translation the fluid within the holder can remain relatively level with respect to the lid while experiencing jolting forces from many directions. This gives the holder three-axis shock absorption, each axis substantially independent of each other.

In FIG. 7 and we see an alternative design for holding canned, bottled and cup beverages. Attachment clip 92 uses the resiliency of fingers 91R and 91L to expand and snap around a cylindrical bar (not shown). Curved section 94 allows the holder to hang vertically even on a sloping bar such as is found on lawn mowers. When placed on a mower, clip 92 would be snapped in place on the side bar just above a stop or bracket. Then the weight of the holder would cause it to slide down the bar during operation until finger 91L comes in contact with the stop or bracket (see FIG. 1). Cans, bottles and cups are placed between back wall 102 and retaining clip 110, where the spring action of the clip secures them in place. The bottom of the can, bottle or cup rests on base 100 to support the weight of the beverage container. As vibration and acceleration is experienced, spring section 96 of the support arm expands and contracts to absorb vertical energy. Side to side and back to front forces are also absorbed by section 96 by torsion and bending with the section elements similar to that seen in FIG. 6. Lower support arm 98 provides a stable base above the center of gravity of the holder so that beverages being held can rest substantially upright when at rest.

SUMMARY, RAMIFICATIONS, and SCOPE

The beverage holders and beverage container holders disclosed here have many advantages over other designs. Ease of manufacture is one advantage of the designs show in FIGS. 7 through 11 where a single-action injection mold can mold the holder as one piece. The inventions combine easy mounting and removal of the beverage container holder while at the same time providing shock absorption which minimizes spilling. An integral spring provides resiliency and energy absorption in the holder to reduce sloshing of the beverage by absorbing forces in the vertical, side-to-side, and front-to-back directions substantially indpendently of each other.

Although the above description of the invention contains many specifications, these should not be viewed as limiting the scope of the invention. Instead, the above description should be considered illustrations of some of the presently preferred embodiments of this invention. For example, the beverage holder in FIG. 2 need not have lid 22 and straw 24 to still be usefull as a cup that mounts on a horizontal bar. The beverage holder will work fine without the lid, however, beverages will spill much more easily without it. If lid 22 is used, hole 19 can be eliminated if sufficient air can enter the container around the straw in hole 17, or between the sealing surfaces 30 and 32 (see FIG. 3). Also, lid 170 can have more than one notch in straw hole 174. Notching all the way around the straw hole with many smaller notches can provide the same air flow while also providing greater resistance to leakage than one large notch. The attachment clip in FIG. 5 has many possible configurations and can be angled to any slope to accommodate any bar, even a vertical bar. For the beverage holder in FIG. 5 to be place on a vertical bar the attachment clip should be placed approximately vertically above the side of holder body 26 so that the holder can rest against the bar for stability. The support arms can also be placed in a number of places on the holder body, and the spring section can even be eliminated if desired to reduce holder size. In FIG. 10 an optional mounting can be obtained by rotating the support arm 90 degrees around the edge of the back wall to align it with the edge of the back wall. Such a holder can still be molded as a single piece if the fingers on attachment clip 136 are combined similar to attachment clip 39 shown in FIGS. 3 and 6 where the arm is molded from the sides instead of from the front and back. The resilient sections (spring) shown on all these designs can be shaped in an almost infinite number of different shapes. FIG. 7 shows substantially 90 degree corners on the spring section, but, nearly any angle can be used and combinations of different angles. The spring section can also be made much smoother like a snake curve or very tight and boxy as shown The spring section can also be altered to increase or decrease resiliency depending on what is desired. Also, in FIGS. 9 and 10, the attachment clip can be made so that it faces 180 degrees from that shown (clip rotated 180 degrees about the longitudinal axis of the upper support arm—note the vertical axis is the longitudinal axis in FIG. 10). By doing this the clip is placed above the body and nearer its hanging center of gravity, thus reducing the forward lean of the holders shown in FIGS. 9 and 10 when in use. The reversing the attachment clip still allows the holder to be molded by a single-action mold since the clip is still being molded on the same plane. Finally, the number of support arms can be varied depending on the need, with more than two arms being practical in certain situations where more than one bar is involved. Also, more than one attachment clip can be placed on the end of each arm. For example, in FIG. 1 the addition of a second attachment clip coming off the top portion of the support arm (just below clip 203) could extend horizontally to attach to push bar 214 to provide greater stability. Such a double attachment clip would also eliminate the need for a stop such as control bracket 216 to keep the holder in place.

Thus, the scope of this invention should not be limited to the above examples, but should be determined from the following claims.

We claim:

1. A holder for a lawn mower for holding an open beverage container, comprising:
   a) a body portion adapted for receiving said open beverage container and holding said open beverage container relatively level when at rest;
   b) at least one support arm having a first and second end with said first end attached to said body portion and said second end adapted for attachment to said lawn mower;
   c) a resilient section on said support arm between said body portion and said second end;
   d) said resilient section allowing sufficient displacement of the body along three-axis to sufficiently dampen vibration for keeping a beverage substantially within said open beverage container while the mower is in use; and
   e) resilient section provides a leveling means for keeping the body substantially level with respect to the net acceleration experience by the body during use, whereby side-to-side sloshing of the liquid in the beverage container is reduced.

2. The holder in claim 1, wherein said resilient section further provides a pivoting means for resilient pivoting of the body along two axis with respect to said second end.

3. A holder for holding a beverage container on violently vibrating mobile equipment, comprising:
   a) a body portion adapted to receive said beverage container;
   b) at least one support arm attached to said body portion and extending from said body portion to an end portion adapted for securing and holding said holder to the mobile equipment during violent vibrations;

c) a resilient section on said support arm between said body portion and said end portion for providing sufficient three-axis displacement of said body portion with respect to said end portion to dampen violent vibrations;

d) said resilient section providing a pivoting means for pivoting the body portion along two-axis of rotation with respect to said end portion; wherein e) said resilient section further includes a leveling means working in cooperation with the body portion keeps said body portion relatively level with respect to the net acceleration experienced by the body, whereby a beverage placed in the body remains there relatively level within its beverage container during jolting forces from may directions.

4. A beverage holder for holding and dispensing liquid beverages on mobile equipment, comprising a) a body portion with an open top;

b) a straw having a body end and a drinking end;

c) a lid adapted to seal said open top of body, said lid having a first and second hole through, said first hole adapted to allow said straw to be inserted and held snugly, said second hole allowing air pressure equalization as fluid is removed through the straw;

d) at least one support arm having a first and second end with said first end having a means of attachment to said body portion;

e) said second end defining a mounting means adapted for attachment to said mobile equipment; and f) said support arm operates as a resilient member in the portion between said first and second end allowing said body portion linear spring-action displacement about three-axis and rotational spring-action about two-axis with respect to said second end to dampen vibration.

5. The holder in claim 4, wherein said mobile equipment is a lawn mower.

6. A lawn mower attachment for holding and dispensing liquid beverages, comprising:

a) a body portion with an open top;

b) a straw portion having a body end and a drinking end;

c) a lid adapted to seal said open top of body, said lid having a hole therethrough adapted to allow said body end of the straw to be inserted and held snugly, said hole also defining a notch for air entry to the body when liquid is removed through said straw;

d) at least one support arm having a first and second end with said body portion attached connected to said first end;

e) said second end defining a pivotal and removably mounting means adapted to attach to a generally cylindrical strut member, whereby said support arm can be attached to a lawn mower push bar;

f) said support arm operates as a resilient member in the portion between said first and second end allowing both vertical and rotational spring-action of said body portion; and said lid further including at least two vertical members defined on its top surface and spaced to allow snug securing of the drinking end of said straw portion.

7. The lawn mower attachment in claim 6 wherein said pivotal and removably mounting means is angled with respect to the support arm to allow substantially vertical mounting of said holder on the sloping side-bar of a lawn mower push handle.

8. A beverage holder for holding and dispensing liquid beverages in high vibration environments comprising:

a) a body portion with an open top;

b) a straw portion;

c) a lid adapted to seal said open top of body, said lid having a first and second hole therethrough, said first hole adapted to allow said straw portion to be inserted and held snugly, said second hole allowing air pressure equalization as fluid is removed through the straw;

d) at least one support arm having a first and second end with said body portion connected to said first end;

e) said support arm defines a resilient section between said first and second end which allows substantially independent vertical and horizontal spring-action of said body portion with respect to said second end;

f) said resilient section also providing two axis of rotation for said body portion with respect to said second end; and g) said second end defines a mounting means for attachment of the beverage holder to said high-vibration equipment.

9. The beverage holder in claim 8 wherein said second hole is formed as a notch in the side of said first hole, whereby the straw is held snugly and air can also enter the body.

10. The beverage holder in claim 8 wherein said lid defines at least two vertical members on its top surface and spaced to allow holding and securing of said straw portion between them when the straw is forced between said vertical members.

11. The beverage holder in claim 8 wherein said mounting means is angled with respect to the support arm to allow generally vertical mounting of said holder on a sloping bar, whereby the holder can be mounted on the side bars of a lawn mower push handle.

12. The beverage holder in claim 11 wherein said support arm defines a resilient section between said first and second ends allowing vertical displacement and two axis of rotational displacement of said body with respect to said second end.

13. The beverage holder in claim 12 wherein said lid defines at least two vertical members on its top surface, said vertical members spaced to allow holding and securing of said straw portion between them when the straw is not in use.

14. A single-piece molded plastic beverage container holder, comprising:

a) at least one support and each having a top and bottom end portion, said top end portion adapted for pivotal and removable mounting to a generally cylindrical bar;

b) a body portion having a base portion, a front portion, and a back portion;

c) said back portion extending substantially vertically upward from said lease portion and defining a hole therethrough sufficiently large to allow an injection molding plate access to form the back side of said front portion during manufacturing;

d) said back portion connecting said base portion to the bottom end portion of each support arm;

e) said front portion defining a resilient retaining clip; and f) a resilient section is defined between said back portion and said top end portion to allow substantial resilient pivoting along two axis, and substantial resilient vertical displacement between said body portion and said pivotal mounting means.

15. The holder in claim 14, wherein said top end portion is formed at a diagonal angle so that the holder can hang substantially vertically on a sloping bar, whereby the holder can be attached to the sloping side portions of a lawn mower push-bar.

16. The container holder in claim 15, wherein said holder is formed as a single injection molded plastic piece.

17. The container holder in claim 14, wherein said holder is formed as a single injection molded plastic piece.

* * * * *